US010242288B2

(12) United States Patent
Li

(10) Patent No.: US 10,242,288 B2
(45) Date of Patent: Mar. 26, 2019

(54) METHOD AND SYSTEM FOR VIDEO PROCESSING

(71) Applicant: SONY CORPORATION, Tokyo (JP)

(72) Inventor: Pingshan Li, Sunnyvale, CA (US)

(73) Assignee: SONY CORPORATION, Tokyo (JP)

( * ) Notice: Subject to any disclaimer, the term of this patent is extended or adjusted under 35 U.S.C. 154(b) by 51 days.

(21) Appl. No.: 15/346,212

(22) Filed: Nov. 8, 2016

(65) Prior Publication Data

US 2018/0129902 A1     May 10, 2018

(51) Int. Cl.
| | | |
|---|---|---|
| *G06K 9/00* | (2006.01) | |
| *G06K 9/46* | (2006.01) | |
| *G06T 7/20* | (2017.01) | |
| *G06K 9/32* | (2006.01) | |
| *G06T 7/00* | (2017.01) | |

(52) U.S. Cl.
CPC ......... *G06K 9/4671* (2013.01); *G06K 9/3241* (2013.01); *G06T 7/0022* (2013.01); *G06T 7/2033* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 8,416,992 | B2 | 4/2013 | Le Meur et al. |
| 8,520,085 | B2 | 8/2013 | Chen et al. |
| 8,891,009 | B2 | 11/2014 | Lu et al. |
| 2012/0294476 | A1 | 11/2012 | Wei et al. |
| 2012/0328161 | A1 | 12/2012 | Palenychka et al. |

FOREIGN PATENT DOCUMENTS

WO     2015/013908 A     2/2015

OTHER PUBLICATIONS

Video saliency incorporating spatiotemporal cues and uncertainty weighting, by Fang et al., IEEE vol. 23, No. 9, Sep. 2014.*
Wangjiang Zhu et al,"Saliency Optimization From Robust Background Detection", IEEE Conference on Computer Vision and Pattern Recognition (CVPR), Apr. 11, 2014, pp. 8.
Ali Borji et al, "Salient Object Detection: A Survey", Computer Vision and Pattern Recognition, ARXIV:1411.5878V1 [CS.CV], Nov. 18, 2014, pp. 26.
Yuming Fang et al, "Video Saliency Incorporating Spatiotemporal Cues and Uncertainty Weighting", 2013 International Conference on Multimedia and Expo (ICME2013), San Jose, CA, USA, Jul. 2013, pp. 6.
Bo Wu et al, "A Unified Framework for Spatiotemporal Salient Region Detection", EURASIP Journal on Image and Video Processing 2013, 2013:Jan. 16, 2013, pp. 12.

* cited by examiner

*Primary Examiner* — Vikkram Bali
(74) *Attorney, Agent, or Firm* — Chip Law Group

(57) ABSTRACT

Various aspects of a system and method for video processing is disclosed herein. The system comprises a video processing device that is configured to generate a spatial saliency map based on spatial information associated with a current frame of a video stream. A spatio-temporal saliency map is generated based on at least motion information associated with the current frame and a previous frame of the video stream. Based on a weighted combination of the generated spatial saliency map and the generated spatio-temporal saliency map, a combined saliency map is generated.

25 Claims, 7 Drawing Sheets

METHOD AND SYSTEM FOR VIDEO PROCESSING

CROSS-REFERENCE TO RELATED APPLICATIONS/INCORPORATION BY REFERENCE

None.

FIELD

Various embodiments of the disclosure relate to a method and system for video processing. More specifically, various embodiments of the disclosure relate to a method and a system for processing a video stream for generation of a combined saliency map.

BACKGROUND

With the advent of recent advancements in the field of computer vision and video processing, various models have been proposed for automatic and/or computational identification of salient objects in an image and/or a video stream. Identification of the salient objects has various applications in the field of video surveillance, image retargeting, video summarization, robot control, navigation assistance, object recognition, adaptive compression, and/or the like. The identification of the salient objects is further useful in image processing techniques, such as auto-focus algorithms, wherein detection of a focus area is performed automatically for video and/or image capturing devices.

Typically, a salient object may be identified based on detection of region of attention (or region-of-interest) of a viewer. This region-of-interest may appear amongst the foreground objects within the scene. Most computer vision models require a set of basic visual characteristics, such as color contrast, intensity, orientation, texture, motion, spatial distance, and/or the like, to generate such saliency maps. Examples of the saliency maps may include, but not limited to, a spatial saliency map, a spatio-temporal saliency map, or a ground truth saliency map. Consequently, identification of the salient objects occurs thereafter.

In a scenario, the spatial saliency map may be generated to highlight the salient objects that are based on the disparity of visual features with respect to the surroundings. This process suppresses the non-salient objects. Alternatively, the spatio-temporal saliency map may be generated to highlight the salient objects based on disparity of motion features in each frame of one or more objects in a video scene, taking spatial features into account. Further, the ground truth saliency map may be generated to highlight the salient objects based on the eye fixation data of the viewer. However, in such scenarios, the identified salient objects may differ in accordance with different saliency maps. Thus, it may be desirable to determine consolidated salient objects in the scene, based on combination of such different types of saliency maps.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system for video processing is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
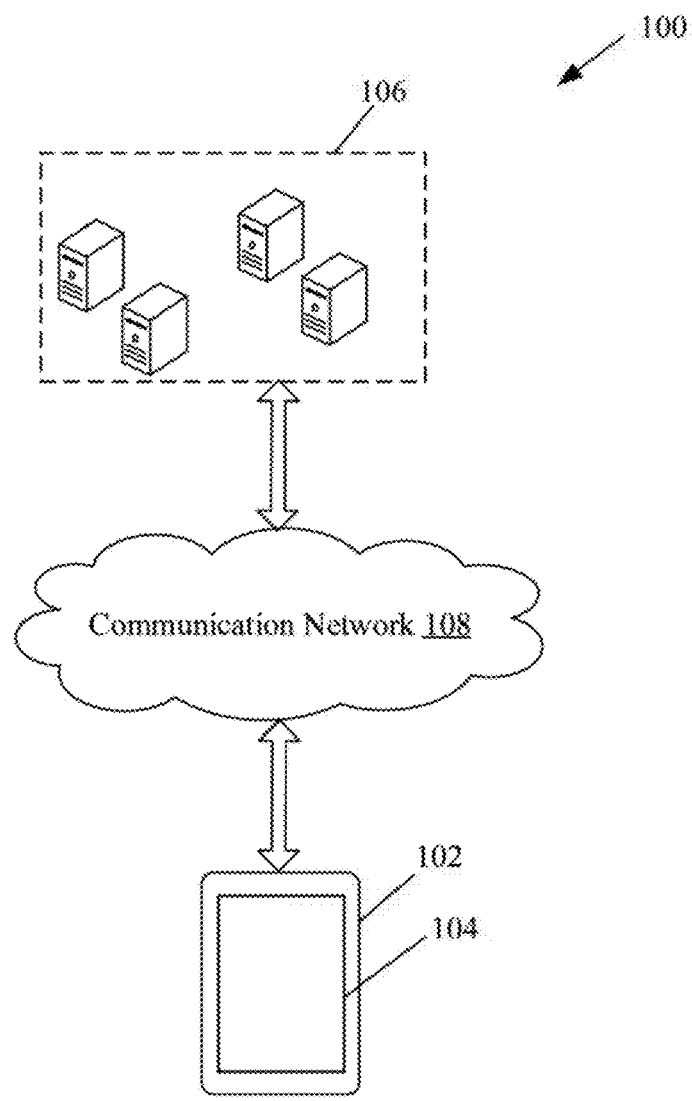
FIG. 1 is a block diagram that illustrates a network environment, in accordance with an embodiment of the disclosure.

Various implementations may be found in a method and/or a system for video processing. Exemplary aspects of the disclosure may comprise a method that may generate a spatial saliency map based on spatial information associated with a current frame of a video stream. The method may further generate a spatio-temporal saliency map, based on at least motion information associated with the current frame and a previous frame of the video stream. Further, a combined saliency map may be generated based on a weighted combination of the spatial saliency map and the spatio-temporal saliency map.

In accordance with an embodiment, the spatial information of one or more pixels in the current frame may be determined. The spatial information may correspond to one or more of color, intensity, orientation, and/or texture information of the one or more pixels in the current frame. Further, based on the determined spatial information, one or more spatial saliency values may be assigned to one or more pixels in the current frame. In accordance with an embodiment, a spatial saliency map may be generated based on the one or more assigned spatial saliency values of the one or more pixels in the current frame.

In accordance with an embodiment, the motion information of the one or more pixels in the current frame may be determined with respect to the corresponding pixels in the previous frame. The motion information may correspond to an optical flow of the one or more pixels in the current frame with respect to the corresponding pixels in the previous frame. Further, spatial distance information of the one or more pixels may be determined in the current frame with respect to the previous frame. Based on the determined motion and spatial distance information, one or more spatio-temporal saliency values may be assigned to the one or more pixels in the current frame. This may be done with respect to the corresponding pixels in the previous frame. In accordance with an embodiment, a spatio-temporal saliency map may be generated based on the one or more spatio-temporal saliency values of the one or more pixels in the current frame. In accordance with an embodiment, the one or more spatio-temporal saliency values may be normalized to a range of values. The normalized range of values may correspond to the optical flow of the one or more pixels in the current frame. This is done with respect to the corresponding pixels in the previous frame.

In accordance with an embodiment, one or more weights may be selected based on learning of at least spatial characteristics, and spatio-temporal characteristics from a plurality of pre-stored saliency maps. Further, a weighted combination of the generated spatial saliency map and the spatio-temporal saliency map may be determined based on the selected one or more weights. In accordance with an embodiment, one or more combined saliency values of the one or more pixels in the current frame may be computed based on the one or more spatial saliency values of the one or more pixels in the current frame, one or more spatio-temporal saliency values of the one or more pixels in the current frame, and the selected one or more weights. In accordance with an embodiment, the combined saliency map may be generated based on the computed one or more combined saliency values.

In accordance with an embodiment, one or more salient objects may be determined based on the combined saliency map. In accordance with an embodiment, the weighted combination may correspond to a combination of the one or more spatial saliency values, the one or more spatio-temporal saliency values, and the one or more weights.

In accordance with an embodiment, the plurality of pre-stored saliency maps may be generated, based on a first set of objects in one or more pre-stored images. In accordance with an embodiment, the plurality of pre-stored saliency maps may be generated, based on a second set of objects in one or more pre-stored video streams. In accordance with an embodiment, the plurality of pre-stored saliency maps may be generated, based on gaze detection of a user with respect to at least one object when the video stream is captured.

In accordance with an embodiment, the selection of one or more weights may be performed to minimize an average difference between computed combined saliency values of the one or more pixels in the generated combined saliency map and saliency values of the one or more pixels in the plurality of pre-stored saliency maps. The average difference indicates that the one or more salient objects determined from the combined saliency map are consistent with respect to the objects in the plurality of pre-stored saliency maps.

FIG. 1 is a block diagram that illustrates a network environment, in accordance with an embodiment of the disclosure. With reference to FIG. 1, there is shown a network environment 100. The network environment 100 may include a video-processing device 102, a display screen 104, a plurality of cloud-based resources 106, and a communication network 108. The video-processing device 102 may comprise the display screen 104. The video-processing device 102 may be communicatively coupled to the plurality of cloud-based resources 106, via the communication network 108.

The video-processing device 102 may comprise suitable logic, circuitry, interfaces, and/or code that may be configured to generate a spatial saliency map, a spatio-temporal saliency map, and a combined saliency map. Examples of the video-processing device 102 may include, but are not limited to, a smartphone, a video camera, a tablet computer, a laptop, a wearable electronic device, and/or other such computing devices.

The display screen 104 may comprise suitable circuitry and/or interfaces that may be configured to display the spatial saliency map, the spatio-temporal saliency map, and the combined saliency map generated by the video-processing device 102. The display screen 104 may be realized through several known technologies, such as but not limited to, Liquid Crystal Display (LCD) display, Light Emitting Diode (LED) display, and/or Organic LED (OLED) display technology.

The plurality of cloud-based resources 106 may comprise one or more servers that may provide video data to one or more subscribed electronic devices, such as the video-processing device 102. The plurality of cloud-based resources 106 may be implemented by use of several technologies that are well known to those skilled in the art. The one or more servers from the plurality of cloud-based resources 106 may be associated with a single or multiple service providers. Examples of the one or more servers may include, but are not limited to, Apache™ HTTP Server, Microsoft® Internet Information Services (IIS), IBM® Application Server, Sun Java™ System Web Server, and/or a file server.

The communication network 108 may include a medium through which the video-processing device 102 may communicate with one or more servers, such as the plurality of cloud-based resources 106. Examples of the communication network 108 may include, but are not limited to, a dedicated short-range communication (DSRC) network, a mobile ad hoc network (MANET), a vehicular ad hoc network (VANET), Intelligent vehicular ad-hoc network (In-VANET), Internet based mobile ad hoc networks (IMANET), a wireless sensor network (WSN), a wireless mesh network (WMN), the Internet, a cellular network, such as a long-term evolution (LTE) network, a cloud network, a Wireless Fidelity (Wi-Fi) network, and/or a Wireless Local Area Network (WLAN). Various devices in the network environment 100 may be configured to connect to the communication network 108, in accordance with various wireless communication protocols. Examples of such wireless communication protocols may include, but are not limited to, IEEE 802.11, 802.11p, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term evolution (LTE), File Transfer Protocol (FTP), ZigBee, EDGE, infrared (IR), and/or Bluetooth (BT) communication protocols.

In operation, the video-processing device 102 may be configured to receive a video stream of a live event, such as a sports event. In accordance with an embodiment, the video stream of the event may be received from the plurality of cloud-based resources 106, via the communication network 108. In accordance with an embodiment, the video stream of the event may be received from a video-capturing unit (described in FIG. 2), installed within or communicatively coupled with the video-processing device 102. The video stream of the event may comprise a plurality of frames that may include a plurality of objects. The current frame may be selected from the plurality of frames.

The video-processing device 102 may be configured to determine spatial information of the one or more pixels of the one or more objects in the current frame. Further, based on the determined spatial information, one or more spatial saliency values may be assigned to the one or more pixels in the current frame. The video-processing device 102 may be configured to generate the spatial saliency map, based on the assigned one or more spatial saliency values of the one or more pixels in the current frame.

The video-processing device 102 may be further configured to determine motion information and spatial distance information of the one or more pixels of the one or more objects in the current frame, with respect to corresponding pixels in a previous frame. Based on the motion information and the spatial distance information, one or more spatio-temporal saliency values may be assigned to the one or more pixels in the current frame. The video-processing device 102 may be further configured to generate the spatio-temporal saliency map, based on the one or more spatio-temporal saliency values of the one or more pixels in the current frame. In accordance with an embodiment, the video-processing device 102 may be configured to normalize the one or more spatio-temporal saliency values to a specific range of values that correspond to the optical flow of the one or more pixels in the current frame with respect to the one or more corresponding pixels in the previous frame.

In accordance with an embodiment, the video-processing device 102 may be configured to select one or more weights, based on learning of at least spatial and spatio-temporal characteristics from a plurality of pre-stored saliency maps, such as ground truth saliency maps. Further, a weighted combination of the generated spatial saliency map and the spatio-temporal saliency map may be determined based on the selected one or more weights. In accordance with an embodiment, the weighted combination may correspond to a mathematical combination of the one or more spatial saliency values, the one or more spatio-temporal saliency values, and/or the one or more weights.

In accordance with an embodiment, the plurality of pre-stored saliency maps may be generated, based on a first set of objects in one or more pre-stored images. In accordance with an embodiment, the plurality of pre-stored saliency maps may be generated, based on a second set of objects in one or more pre-stored video streams. In accordance with an embodiment, the plurality of pre-stored saliency maps may be generated, based on gaze detection of a user with respect to at least one object when the video stream is captured.

In accordance with an embodiment, one or more combined saliency values of the one or more pixels in the current frame may be computed based on the one or more spatial saliency values of the one or more pixels in the current frame, one or more spatio-temporal saliency values of the one or more pixels in the current frame with respect to the corresponding pixels in the previous frame, and the selected one or more weights. In accordance with an embodiment, the combined saliency map may be generated based on the computed one or more combined saliency values. The video-processing device 102 may be further configured to determine one or more salient objects, based on the combined saliency map.

In accordance with an embodiment, the video-processing device 102 may be configured to compute an average difference between computed combined saliency values of the one or more pixels in the generated combined saliency map and saliency values of the one or more pixels in the plurality of pre-stored saliency maps. In accordance with an embodiment, the selection of one or more weights may be performed to minimize an average difference between the computed combined saliency values of the one or more pixels in the generated combined saliency map and saliency values of the one or more pixels in the plurality of pre-stored saliency maps. The average difference indicates that the one or more salient objects determined from the combined saliency map are consistent with respect to the objects in the plurality of pre-stored saliency maps.

Figure 2:
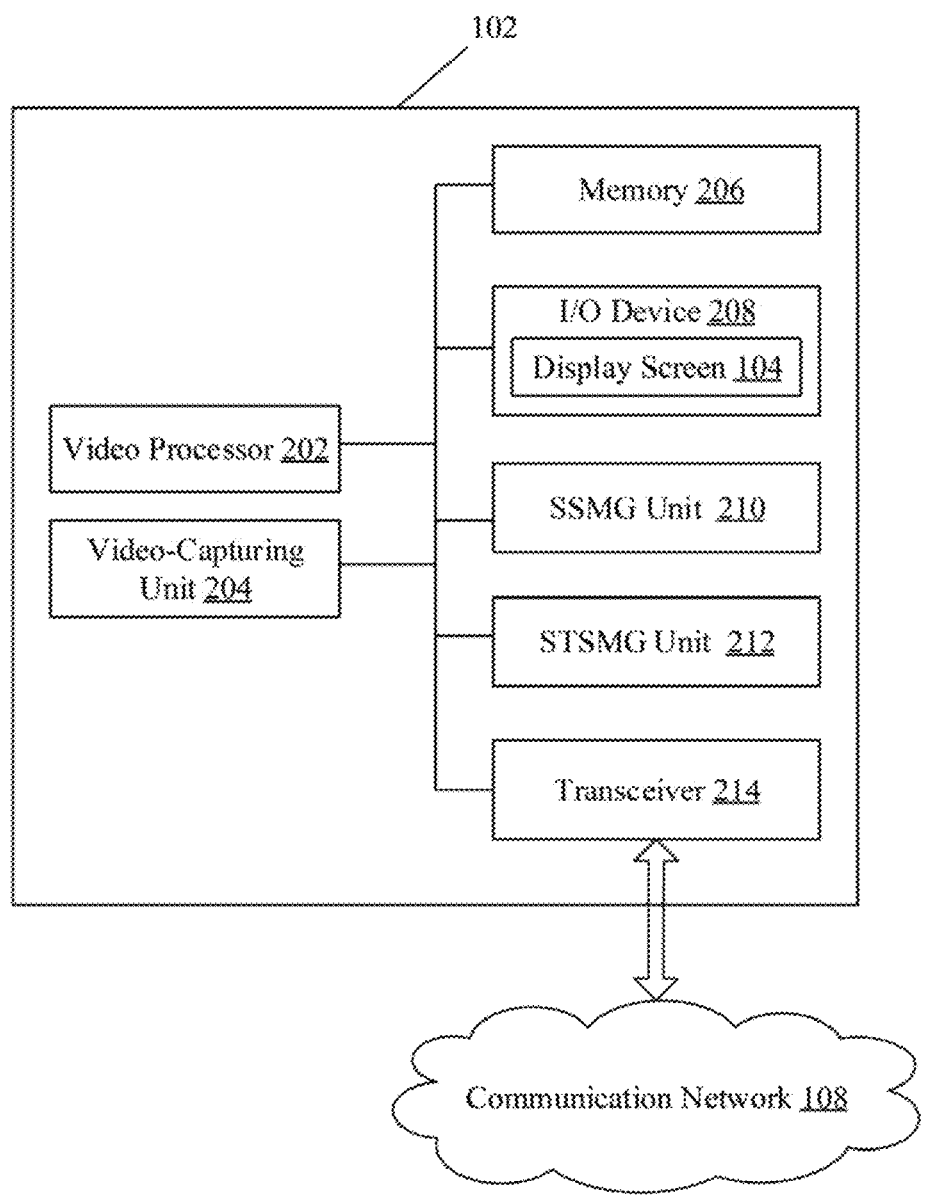
FIG. 2 is a block diagram that illustrates various components of a video-processing device, in accordance with an embodiment of the disclosure.

FIG. 2 is a block diagram that illustrates an exemplary video-processing device, in accordance with an embodiment of the disclosure. FIG. 2 is explained in conjunction with elements from FIG. 1. With reference to FIG. 2, there is shown the video-processing device 102. The video-processing device 102 may comprise a video processor 202, a video-capturing unit 204, a memory 206, one or more input/output (I/O) devices, such as an I/O device 208, a spatial saliency map generation (SSMG) unit 210, a spatio-temporal saliency map generation (STSMG) unit 212, and a transceiver 214. With reference to FIG. 2, there is further shown the display screen 104 and the communication network 108, as described in FIG. 1.

The video processor 202 may be communicatively coupled to the memory 206, the I/O device 208, the SSMG unit 210, the STSMG unit 212 and the transceiver 214. The transceiver 214 may be configured to communicate with the one or more servers, such as the plurality of cloud-based resources 106, via the communication network 108.

The video processor 202 may comprise suitable logic, circuitry, interfaces, and/or code that may be configured to execute a set of instructions stored in the memory 206. The video processor 202 may be further configured to generate a combined saliency map. The video processor 202 may be implemented based on a number of electronic control unit technologies known in the art. Examples of the video processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The video-capturing unit 204 may comprise suitable logic, circuitry, interfaces, and/or code that may be configured to capture one or more frames of a scene in real-time. The video-capturing unit 204 may be further configured to capture still views in a sequence of frames. The video-capturing unit 204 may comprise a viewfinder that may be configured to compose and/or focus the one or more frames captured by the video-capturing unit 204. The video-capturing unit 204 may be configured to store the captured one or more frames in a local buffer and/or the memory 206. Examples of video-capturing unit 204 may include, but are not limited to, a digital video recorder, and/or a video camera.

The memory 206 may comprise suitable logic, circuitry, and/or interfaces that may be configured to store a machine code and/or a computer program with at least one code section executable by the video processor 202. The memory 206 may be further configured to store one or more of a motion detection algorithm, a color detection algorithm, an intensity detection algorithm, a texture detection algorithm, an orientation detection algorithm, a spatial saliency map generation algorithm, a spatio-temporal saliency map generation algorithm, and/or a mean shift algorithm. The memory 206 may be further configured to store operating systems and associated applications of the video-processing device 102. Examples of implementation of the memory 206 may include, but are not limited to, Random Access Memory (RAM), Read Only Memory (ROM), Solid-state Drive (SSD), Hard Disk Drive (HDD), Flash memory, and/or a Secure Digital (SD) card.

The I/O device 208 may comprise suitable logic, circuitry, interfaces, and/or code that may be configured to receive an input from a user (not shown). The input from the user may correspond to capturing of a video stream of a live event. The I/O device 208 may be further configured to provide an output to the user. The output to the user may correspond to visualization of at least a spatial saliency map, a spatio-temporal saliency map, and a combined saliency map. The I/O device 208 may comprise various input and output devices that may be configured to communicate with the video processor 202. Examples of the input devices may include, but are not limited to, the video-capturing unit 204, a camcorder, a touch screen, a keyboard, a mouse, a joystick, a microphone, a motion sensor, a light sensor, and/or a docking station. Examples of the output devices may include, but are not limited to, the display screen 104, a projector screen, and/or a speaker.

The SSMG unit 210 may comprise suitable logic, circuitry, interfaces, and/or code that may be configured to generate a spatial saliency map, based on spatial information that may correspond to one or more of color, intensity, orientation, and texture information of the one or more pixels in the current frame. The SSMG unit 210 may be communicatively coupled to the video processor 202. The SSMG unit 210 may be configured to determine the color, intensity, orientation, and texture information of the one or more pixels in the current frame, based on one or more algorithms retrieved from the memory 206.

The STSMG unit 212 may comprise suitable logic, circuitry, interfaces, and/or code that may be configured to generate a spatio-temporal saliency map, based on motion information and spatial distance of the one or more pixels in a current frame with respect to the corresponding pixels in a previous frame. The STSMG unit 212 may be communicatively coupled to the video processor 202. The STSMG unit 212 may be configured to determine an optical flow and spatial distance of the one or more pixels in the current frame with respect to the corresponding pixels in the previous frame. The STSMG unit 212 may be configured to determine the optical flow and the spatial distance of the one or more pixels in the current frame based on one or more algorithms retrieved from the memory 206.

The transceiver 214 may comprise suitable logic, circuitry, interfaces, and/or code that may be configured to communicate with one or more servers, such as the plurality of cloud-based resources 106, via the communication network 108 (as shown in FIG. 1). The transceiver 214 may implement known technologies to support wired or wireless communication of the video-processing device 102 with the communication network 108. The transceiver 214 may include various components, examples of which may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The transceiver 214 may communicate, via wireless communication, with networks (such as the Internet and/or the Intranet) and/or a wireless network (such as a cellular telephone network, a wireless local area network (LAN) and/or a metropolitan area network (MAN)). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the video-capturing unit 204 may be configured to capture a video stream of an event, such as a car race. The video-capturing unit 204 may be further configured to communicate the captured video stream to the video processor 202. The video stream may comprise a plurality of frames. The plurality of frames may include at least a current frame and a previous frame. The current frame may comprise a plurality of objects. For example, when the event is a car race, the plurality of objects may correspond to one or more cars and/or an audience present in the scene.

The video processor 202 may be configured to transmit the current frame to the SSMG unit 210. The SSMG unit 210 may be configured to determine spatial information of the one or more pixels associated with each of the one or more objects, in the current frame. The spatial information may correspond to one or more of color, intensity, orientation, and/or texture information of the one or more pixels in the current frame. The color information of the one or more pixels in the current frame may be determined by use of one or more color detection algorithms. Examples of the one or more color detection algorithms may include, but are not limited to, an edge detection algorithm and/or a color-feature detection algorithm. The video processor 202 may be configured to retrieve the one or more color detection algorithms from the memory 206. The color information of the one or more pixels may correspond to a basic color model, such as a red-green-blue (RGB) color model. However, the disclosure may not be so limited, and other color models (such as the YUV color model that comprises a luminance (Y) component, and two chrominance (UV) components), may also be utilized, without deviation from the scope of the disclosure.

In accordance with an embodiment, the SSMG unit 210 may be configured to determine color values of the one or more pixels from the RGB color model. Based on the determined color values of the one or more pixels, the SSMG unit 210 may determine an average color value of the current frame. Further, a spatial saliency value may be assigned to the one or more pixels, based on difference between the average color value and the individual color values of the one or more pixels. A high spatial saliency value may be assigned to pixels when the difference exceeds a threshold value. Similarly, a low spatial saliency value may be assigned to pixels when the difference is less than the threshold value. Based on the assigned spatial saliency values, the SSMG unit 210 may be configured to generate a spatial saliency map. In accordance with an embodiment, the pixels with higher spatial saliency value may be represented with high intensity of color, such as white, in the spatial saliency map. Similarly, the pixels with low spatial saliency value may be represented with low intensity of color, such as gray, in the spatial saliency map. The spatial saliency map may be generated by use of one or more spatial saliency map generation algorithms. The video processor 202 may be configured to retrieve the spatial saliency map generation algorithms from the memory 206. Examples of such one or more spatial saliency map generation algorithms include, but are not limited to, an iterative method, a graph-based saliency (GBVS) method, a global-contrast based method, a spectral residual approach, and Itti-Koch method.

In accordance with an embodiment, the video processor 202 may be configured to transmit the current frame and the previous frame to the STSMG unit 212, via the transceiver 214. The STSMG unit 212 may be configured to determine motion information of the one or more pixels associated with an object of the one or more objects in the current frame, with respect to pixels associated with the similar object in the previous frame. The motion information of the one or more pixels may be determined by use of one or more motion detection algorithms retrieved from the memory 206. Examples of the one or more motion detection algorithms may include, but are not limited to, a frame subtraction algorithm, a background subtraction algorithm, and an optical flow algorithm.

The STSMG unit 212 may be configured to use one or more motion detection algorithms, such as the optical flow algorithm, to determine the motion information of the one or more pixels in the current frame. The motion information may correspond to an optical flow of the one or more pixels in the current frame with respect to corresponding pixels in the previous frame. Accordingly, the STSMG unit 212 may be configured to determine the optical flow of the one or more pixels associated with an object in the current frame with respect to the one or more pixels associated with the similar object in the previous frame.

In accordance with an embodiment, the STSMG unit 212 may be further configured to determine spatial distance information of the one or more pixels associated with an object in the current frame, with respect to the one or more pixels associated with the similar object in the previous frame. Such spatial distance information may be determined by use of one or more mean-shift algorithms, such as an anisotropic kernel mean shift algorithm, that may be retrieved from the memory 206. The spatial distance information may correspond to a shift in spatial position of the one or more pixels associated with the object in the current frame, with respect to positions of one or more pixels associated with the similar object in the previous frame. The spatial distance of the one or more pixels may be determined based on comparison of the current frame with the previous frame. Notwithstanding, the disclosure may not be so limited, and other techniques known in the art may be implemented to determine spatial distance information, without deviation from the scope of the disclosure.

The STSMG unit 212 may be configured to assign spatio-temporal saliency values to the one or more pixels in the current frame, based on the optical flow and spatial distance of the one or more pixels in the current frame. This is done with respect to the one or more pixels associated in the previous frame. In accordance with an embodiment, the pixels with high optical flow and high spatial distance may be assigned high spatio-temporal saliency values. Similarly, the pixels with low optical flow and low spatial distance may be assigned low spatio-temporal saliency values. Based on the determination of the spatio-temporal saliency values of the one or more pixels in the current frame, the STSMG unit 212 may be configured to generate a spatio-temporal saliency map. In accordance with an embodiment, the pixels with high spatio-temporal saliency value may be represented with high intensity of color, such as white, in the spatio-temporal saliency map. Similarly, the pixels with low spatio-temporal saliency value may be represented with low intensity of color, such as various shades of gray color, in the spatio-temporal saliency map.

In accordance with an embodiment, the STSMG unit 212 may be configured to normalize the spatio-temporal saliency values of the one or more pixels to a range of values that correspond to the optical flow of the one or more pixels in the current frame with respect to one or more corresponding pixels in the previous frame. The STSMG unit 212 may be configured to normalize the spatio-temporal saliency values of the one or more pixels, in accordance with equation (2), as follows:

$$T:T \in \left[0, \sqrt{[\max(v_x) - \min(v_x)]^2 + [\max(v_y) - \min(v_y)^2]}\,\right] \quad (2)$$

where, "$v_x$" and "$v_y$" denote the optical flow of each pixel in "x" and "y" direction, respectively, and "T" denotes the set of spatial-temporal saliency values. Notwithstanding, the normalization of spatio-temporal saliency values of the one or more pixels may vary beyond the described range of values, based on hardware and/or software configuration of the video-processing device 102, without deviation from the scope of the disclosure.

In accordance with an embodiment, the video processor 202 may be configured to determine a weighted combination of the generated spatial saliency map and the generated spatio-temporal saliency map. The weighted combination may be determined based on one or more weights. The one or more weights may be selected based on learning of at least spatial and spatio-temporal characteristics from a plurality of pre-stored saliency maps, such as ground truth saliency maps. The video processor 202 may be configured to generate the plurality of pre-stored saliency maps, based on a first set of objects in one or more pre-stored images, a second set of objects in one or more pre-stored video streams, and/or gaze detection of the user with respect to at least one object when the video stream is captured.

In accordance with an embodiment, the pre-stored saliency maps may correspond to a set of samples of pre-stored saliency maps. The set of samples may be retrieved by the video processor 202 from the memory 206. In accordance with an embodiment, the set of samples may be retrieved by the video processor 202 from the plurality of cloud-based resources 106. For example, the examples of the set of samples may include, but are not limited to, a Georgia Tech Egocentric Activities (GTEA) Gaze dataset, a Georgia Tech Egocentric Activities (GTEA) dataset, and an Activities of Daily Living (ADL) dataset.

The video processor 202 may be further configured to compute one or more combined saliency values of the one or more pixels in the current frame. The one or more combined saliency values may be computed based on one or more spatial saliency values of the one or more pixels in the current frame, one or more spatio-temporal saliency values of the one or more pixels in the current frame with respect to the corresponding pixels in the previous frame, and the one or more weights. Further, the video processor 202 may be configured to generate a combined saliency map based on the computed combined saliency values. In accordance with an embodiment, the computation of one or more combined saliency values may be a linear mathematical combination of the one or more spatial saliency values, the one or more spatio-temporal saliency values, and the one or more weights. In accordance with an embodiment, the computation of one or more combined saliency values may be a non-linear combination of the one or more spatial saliency values, the one or more spatio-temporal saliency values, and the one or more weights. In accordance with an embodiment, the video processor 202 may compute the combined saliency value, in accordance with equation (3), as follows:

$$C = a \cdot S + b \cdot T + c \cdot S \circ T \quad (3)$$

where "a", "b", and "c" denote constant weights;
"S" denotes spatial saliency value of each pixel; and
"T" denotes spatio-temporal saliency value of each pixel.

In accordance with an embodiment, the weighted combination of the generated spatial saliency map and the generated spatio-temporal saliency map may be determined in accordance with the equation (3). In accordance with an embodiment, the combined saliency map may be generated based on the weighted combination of the generated spatial saliency map and the generated spatio-temporal saliency map. In other words, the weighted combination, for example the combined saliency value "C", of the generated spatial saliency map and the generated spatio-temporal saliency map may be determined in accordance with the equation (3), based on a summation of a first value, a second value, and a third value. The first value "a·S" is a product (for example a scalar multiplication) of a first constant weight, such as "a", and a spatial saliency value, such as "S", of a pixel of the current frame. The second value, for example "b·T", may be a product (for example a scalar multiplication) of a second constant weight, such as "b", and a spatio-temporal saliency value, such as "T", associated with the pixel. The third value, for example c·S∘T, is a product of a third constant weight, such as "c" and the Hadamard product (denoted by symbol "∘") of the spatial saliency value, such as "S" and the spatio-temporal saliency value, such as "T". In accordance with an embodiment, the pixels with high combined saliency value may be represented with high intensity of color, such as white, in the combined saliency map. Similarly, the pixels with low combined saliency value may be represented with low intensity of color, such as various shades of gray color, in the combined saliency map. Further, the video processor 202 may determine one or more salient objects based on the combined saliency map.

In accordance with an embodiment, the video processor 202 may be configured to determine the plurality of weights from the plurality of pre-stored saliency maps. Further, one or more weights may be selected from the plurality of determined weights based on learning of at least spatial characteristics and spatio-temporal characteristics from the plurality of pre-stored saliency maps. The selected one or more weights may correspond to constant weights, such as "a", "b", and "c", as depicted in the equation (3). In accordance with an embodiment, the selection of the one or more weights may be performed to minimize the average difference between each of the computed combined saliency values of one or more pixels in the generated combined saliency map and saliency values of the one or more pixels in the plurality of pre-stored saliency maps. The spatial characteristics may correspond to at least the color, the intensity, the orientation, and the texture information of each pixel associated with the plurality of pre-stored saliency maps. In accordance with an embodiment, the average difference indicates that the one or more salient objects determined from the combined saliency map are consistent with respect to the objects in the plurality of pre-stored saliency maps.

Figure 3A:
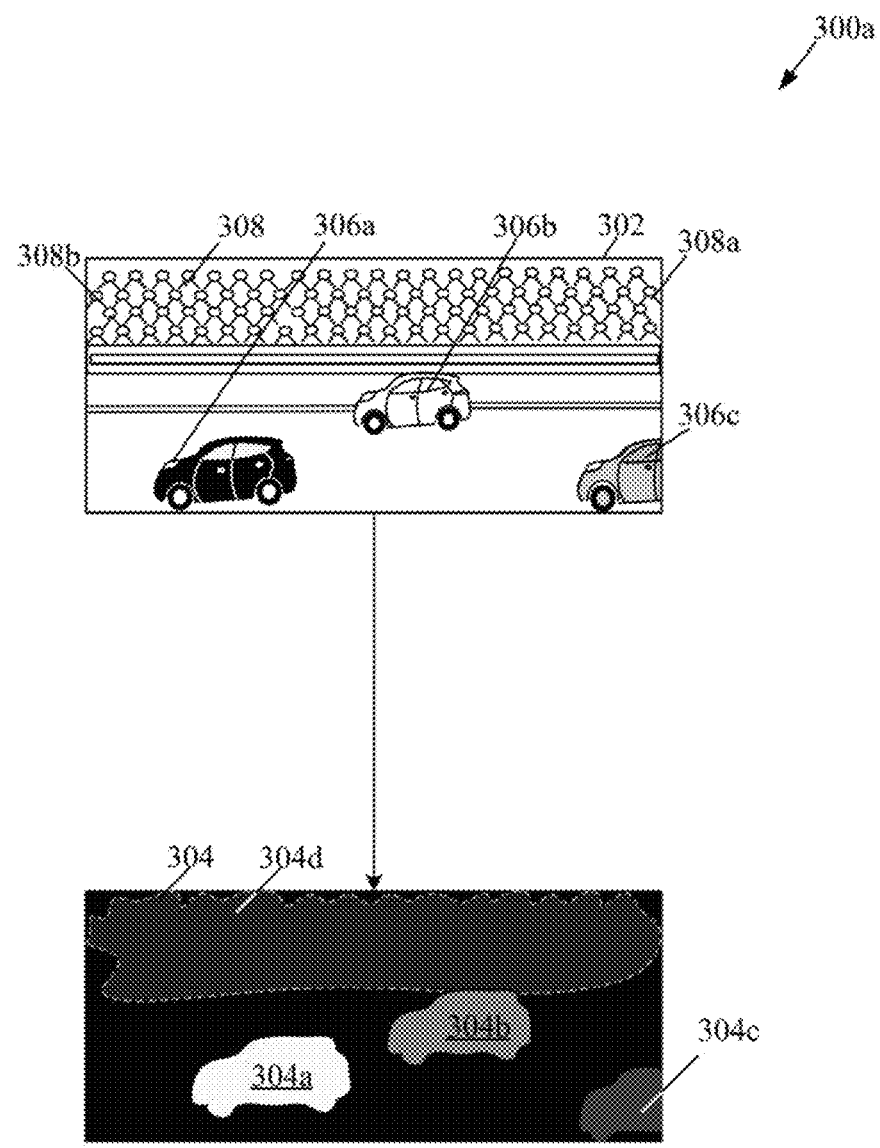
FIGS. 3A, 3B, and 3C illustrate various exemplary scenarios for implementation of the disclosed method and system for video processing, in accordance with an embodiment of the disclosure.
Figure 3B:
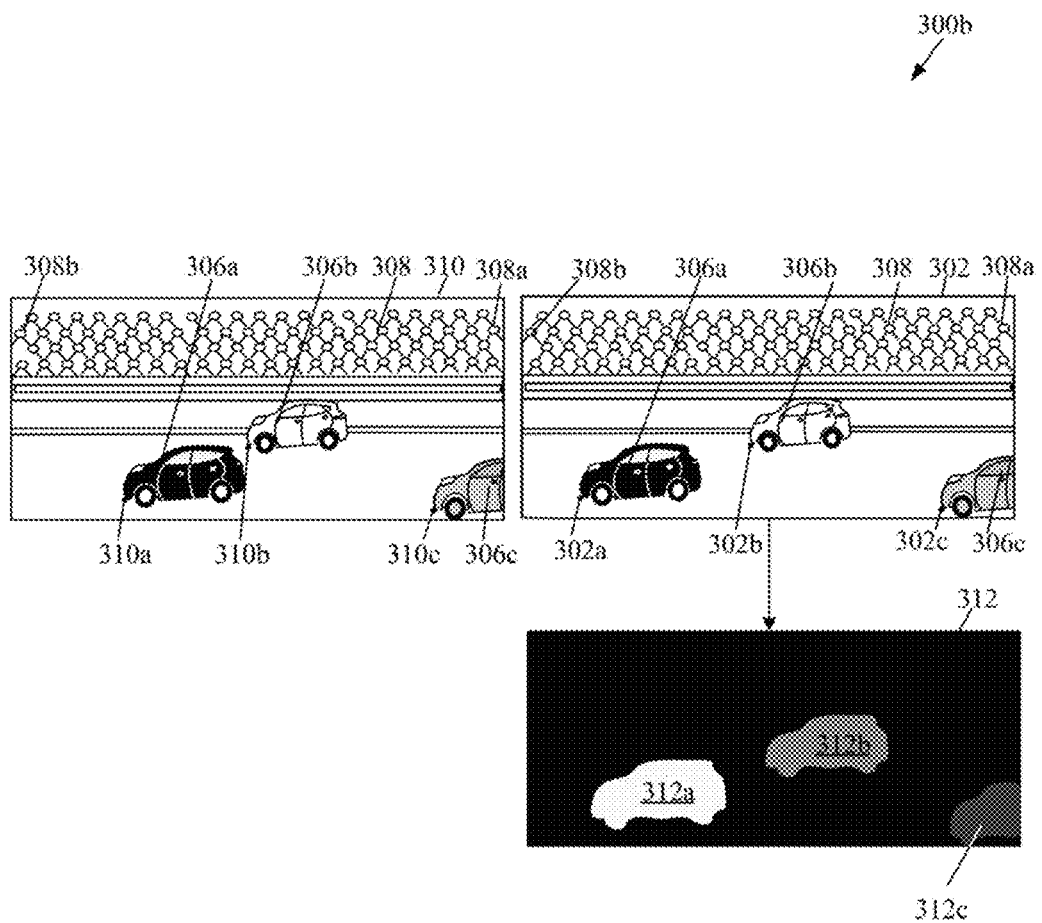
Figure 3C:
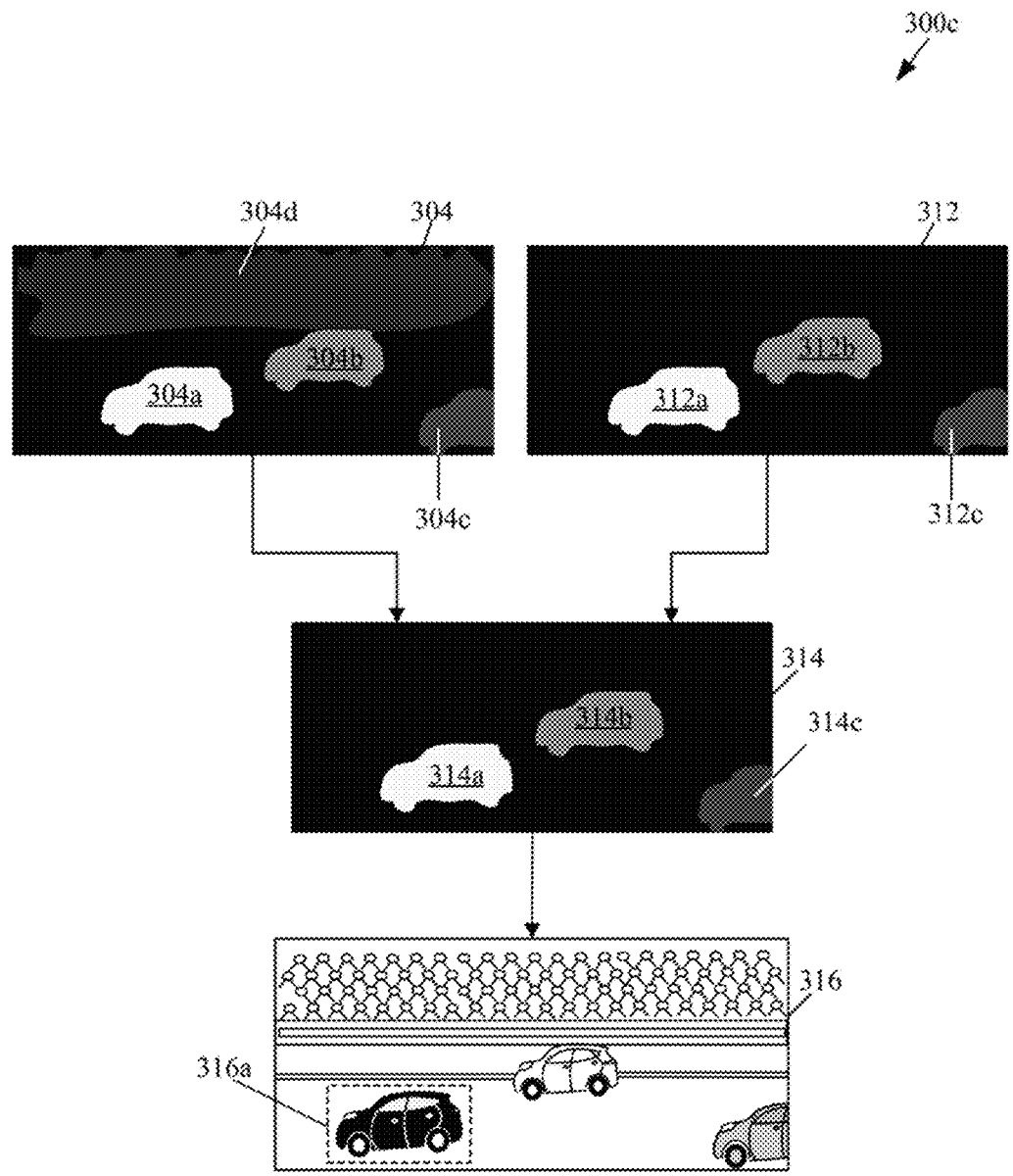

FIGS. 3A, 3B, and 3C illustrate various exemplary scenarios for the implementation of the disclosed method and system for video processing, in accordance with an embodiment of the disclosure. FIGS. 3A, 3B, and 3C are explained in conjunction with elements from FIG. 1 and FIG. 2. With reference to FIG. 3A, there is shown a first exemplary scenario 300a. In accordance with the first exemplary scenario 300a, there is shown a current frame 302, and a spatial saliency map 304 of the video stream. The current frame 302 may include a plurality of cars 306, such as a first car 306a, a second car 306b, and a third car 306c. The current frame 302 may include a plurality of spectators 308 that may include at least a first spectator 308a and a second spectator 308b. The spatial saliency map 304 may include a first region 304a, a second region 304b, and a third region 304c.

In accordance with the first exemplary scenario 300a, as illustrated in FIG. 3A, the current frame 302 may correspond to a scene of a sports event, such as a car rally. The current frame 302 may comprise a plurality of objects, such as the first car 306a, the second car 306b, the third car 306c, and the plurality of spectators 308 (including at least the first spectator 308a and the second spectator 308b).

In accordance with an instance of the first exemplary scenario 300a, the video processor 202 may be configured to transmit the current frame 302 to the SSMG unit 210. After receipt of the current frame 302, the SSMG unit 210 may be configured to determine the color information of the one or more pixels in the current frame by use of one or more color detection algorithms, such as a color-feature detection algorithm. In accordance with an embodiment, the SSMG unit 210 may be configured to determine one or more color values of the one or more pixels, from the RGB color model. The average color value of the current frame 302 may be determined based on the determined color values of the one or more pixels. Further, one or more spatial saliency values may be assigned to the one or more pixels, based on difference between the average color value and the color values of the one or more pixels.

Accordingly, the one or more pixels associated with the first car 306a may demonstrate a high difference as the first car 306a has color of high contrast as compared with the second car 306b, the third car 306c, and the plurality of spectators 308. Hence, the one or more pixels associated with the first car 306a may be assigned higher spatial saliency values. Similarly, the one or more pixels associated with the second car 306b and the plurality of spectators 308 may demonstrate a low difference. Hence, the one or more pixels associated with the second car 306b, the third car 306c, and the plurality of spectators 308 may be assigned lower spatial saliency values. Based on the assigned spatial saliency values, the SSMG unit 210 may be configured to generate the spatial saliency map 304. The one or more pixels associated with the first car 306a may be represented with white color regions, such as the first region 304a, in the spatial saliency map 304. Similarly, the one or more pixels associated with the second car 306b, the one or more pixels associated with the third car 306c, and the plurality of spectators 308 may be represented with light, moderate and dark gray color regions (such as the second region 304b, the third region 304c, and the fourth region 304d), respectively, in the spatial saliency map 304. The spatial saliency map 304 may be generated by use of one or more algorithms known in the art. Examples of such one or more algorithms may include, but are not limited to, an iterative method, a graph-based saliency (GBVS) method, a global-contrast based method, a spectral residual approach, and/or the Itti-Koch method.

With reference to FIG. 3B, there is shown a second exemplary scenario 300b. FIG. 3B is explained in conjunction with elements from FIG. 1, FIG. 2, and FIG. 3A. The second exemplary scenario 300b may include the current frame 302, a previous frame 310, and a spatio-temporal saliency map 312. The current frame 302 may comprise a plurality of objects, such as the first car 306a, the second car 306b, the third car 306c, and the plurality of spectators 308. The location of the first car 306a, the second car 306b, and the third car 306c, in the current frame 302 may be a first location 302a, a second location 302b, and a third location 302c, respectively. The previous frame 310 may comprise the same plurality of objects as in the current frame 302, but at different locations as the plurality of objects are in motion. The location of the first car 306a, the second car 306b, and the third car 306c, in the previous frame 310 may be a first location 310a, a second location 310b, and a third location 310c, respectively. The spatio-temporal saliency map 312 may include a first region 312a, a second region 312b, and a third region 312c.

With reference to the second exemplary scenario 300b, the video processor 202 may be configured to transmit the current frame 302 to the STSMG unit 212. After the receipt of the current frame 302, the STSMG unit 212 may be configured to determine the motion information of the one or more pixels in the current frame 302 with respect to the one or more pixels in the previous frame 310, by use of an optical flow algorithm. In an instance, the motion information corresponds to an optical flow of the one or more pixels in the current frame 302 with respect to the previous frame 310. The STSMG unit 212 may be further configured to determine the optical flow of the one or more pixels in the current frame 302 with respect to one or more corresponding pixels in the previous frame 310.

In accordance with an instance of the exemplary scenario, the STSMG unit 212 may be further configured to determine spatial distance information of the one or more pixels in the current frame 302, with respect to the previous frame 310, by use of mean shift algorithms, such as an anisotropic kernel mean shift algorithm. The spatial distance information may correspond to a shift in position of the one or more pixels in the current frame 302, with respect to the previous frame 310. The spatial distance of the one or more pixels may be determined based on comparison of the current frame 302 with the previous frame 310.

The STSMG unit 212 may be configured to assign one or more spatio-temporal saliency values to the one or more pixels in the current frame 302, based on the optical flow and the spatial distance of the one or more pixels in the current frame 302 with respect to the previous frame 310. Accordingly, the one or more pixels associated with the first car 306a in the current frame 302 demonstrates a high optical flow and high spatial distance with respect to the previous frame 310, as the speed of the first car 306a is high as compared to the speed of the second car 306b and the speed of the third car 306c. Hence, the one or more pixels associated with the first car 306a may be assigned high spatio-temporal saliency values in the first region 312a. Similarly, the one or more pixels associated with the second car 306b in the current frame 302 demonstrates a low optical flow and low spatial distance with respect to the previous frame 310. Hence, the one or more pixels associated with the second car 306b may be assigned low spatio-temporal saliency values in the second region 312b. The one or more pixels associated with the third car 306c in the current frame 302 demonstrates a low optical flow and similar spatial distance with respect to the previous frame 310. Hence, the one or more pixels associated with the third car 306c may be assigned low spatio-temporal saliency values in the third region 312c. Further, the one or more pixels associated with the plurality of spectators 308 may not be assigned spatio-temporal saliency values, due to an insignificant motion information. Based on the assigned one or more spatio-temporal saliency values, the STSMG unit 212 may be configured to generate a spatio-temporal saliency map 312. The one or more pixels associated with the first car 306a may be represented with a white color region, such as the first region 312a, in the spatio-temporal saliency map 312. Similarly, the one or more pixels associated with the second car 306b and the third car 306c may be represented with respective light and dark gray color regions, such as the second region 312b and third region 312c, in the spatio-temporal saliency map 312.

In accordance with an embodiment, the STSMG unit 212 may be configured to normalize the one or more spatio-temporal saliency values of the one or more pixels to a specific range of values. The normalized range of values may correspond to the optical flow of the one or more pixels in the current frame with respect to the corresponding pixels in the previous frame. The STSMG unit 212 may normalize the one or more spatio-temporal saliency values of the one or more pixels, in accordance with the equation (2).

The video processor 202 may be configured to determine a weighted combination based on one or more weights. The one or more weights may be computed based on learning of at least spatial and spatio-temporal characteristics from a plurality of pre-stored saliency maps. The pre-stored saliency maps may be retrieved from a database stored in the memory 206.

With reference to FIG. 3C, there is shown a third exemplary scenario 300c. FIG. 3C is explained in conjunction with elements from FIG. 1, FIG. 2, FIG. 3A, and FIG. 3B. FIG. 3C includes the spatial saliency map 304, the spatio-temporal saliency map 312, a combined saliency map 314, and a video frame 316. The spatial saliency map 304 may comprise the first region 304a, the second region 304b, the third region 304c, and the fourth region 304d. The spatio-temporal saliency map 312 may comprise the first region 312a, the second region 312b, and the third region 312c. The combined saliency map may 314 may comprise a first region 314a, a second region 314b and a third region 314c. The video frame 316 may comprise a region 316a.

In accordance with the third exemplary scenario 300c, as illustrated in FIG. 3C, the video processor 202 may be configured to compute one or more combined saliency values of the one or more pixels. The computation may be based on one or more spatial saliency values of the one or more pixels in the current frame 302. Further, the computation may be based on one or more spatio-temporal saliency values of the one or more pixels in the current frame 302 with respect to the previous frame 310, and the one or more weights of the one or more pixels. The video processor 202 may compute the one or more combined saliency values for one or more pixels in accordance with the equation (3).

In accordance with an embodiment, the video processor 202 may be configured to generate the combined saliency map 314, based on the computed one or more combined saliency values of the one or more pixels. The one or more pixels associated with the first car 306a may demonstrate a high combined saliency value. Hence, the one or more pixels associated with the first car 306a may be represented with a white color region, such as the first region 314a, in the combined saliency map 314. Similarly, the one or more pixels associated with the second car 306b and the third car 306c demonstrates low combined saliency values. Hence, the one or more pixels associated with the second car 306b and third car 306c may be represented with a light and dark gray color region, such as the second region 314b, and the third region 314c in the combined saliency map 314. Further, a salient region, such as the first region 314a, may be determined based on the combined saliency map 314. The first region 314a may correspond to a salient object, such as the first car 306a. Further, the video processor 202 may be configured to focus on the region 316a, which may be represented by a dotted line in the video frame 316. The region 316a may correspond to the first car 306a, which moves with high speed and has a high contrast of color. Hence, the video-capturing unit 204 may capture the video frame 316 with a focus on the region 316a, which corresponds to the first car 306a.

Figure 4A:
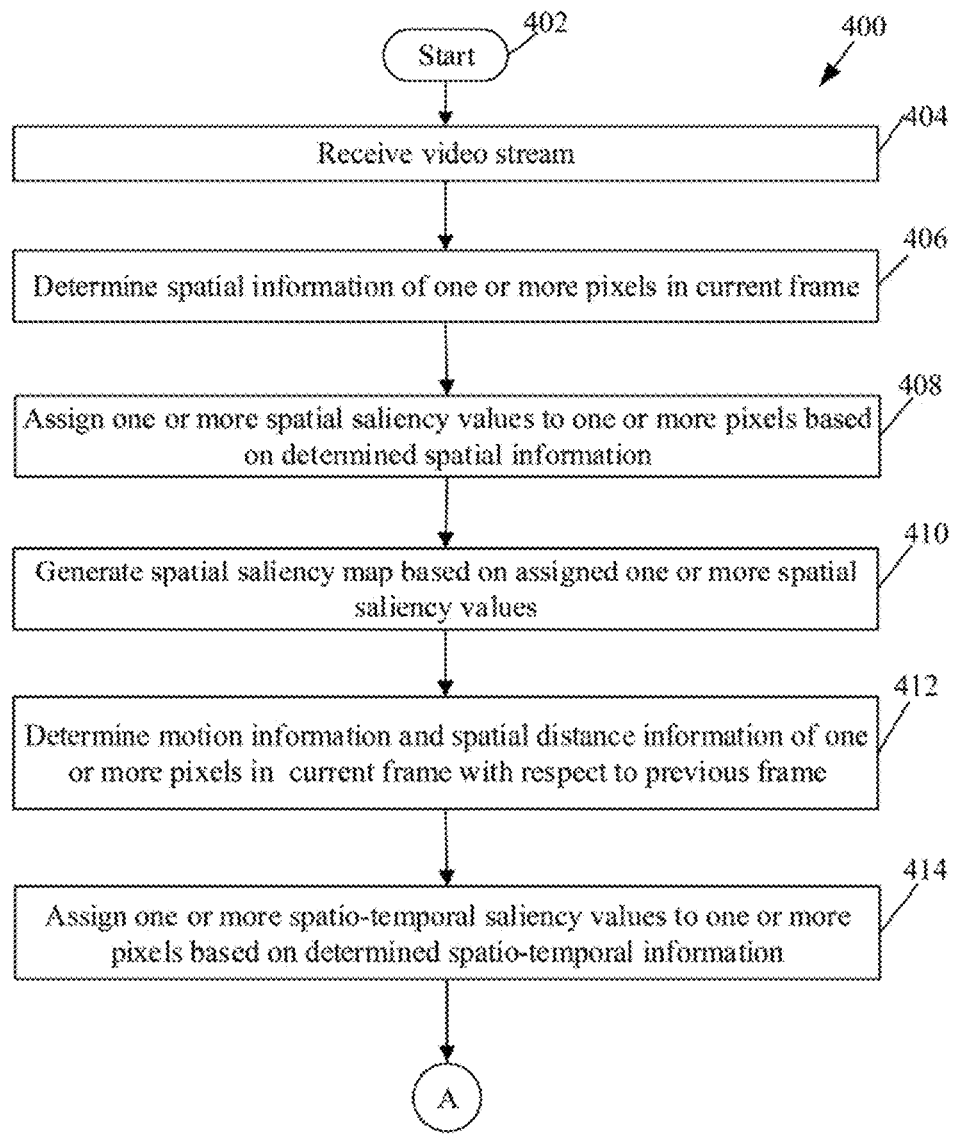
FIGS. 4A and 4B collectively depict a flowchart that illustrates a method for video processing, in accordance with an embodiment of the disclosure.
Figure 4B:
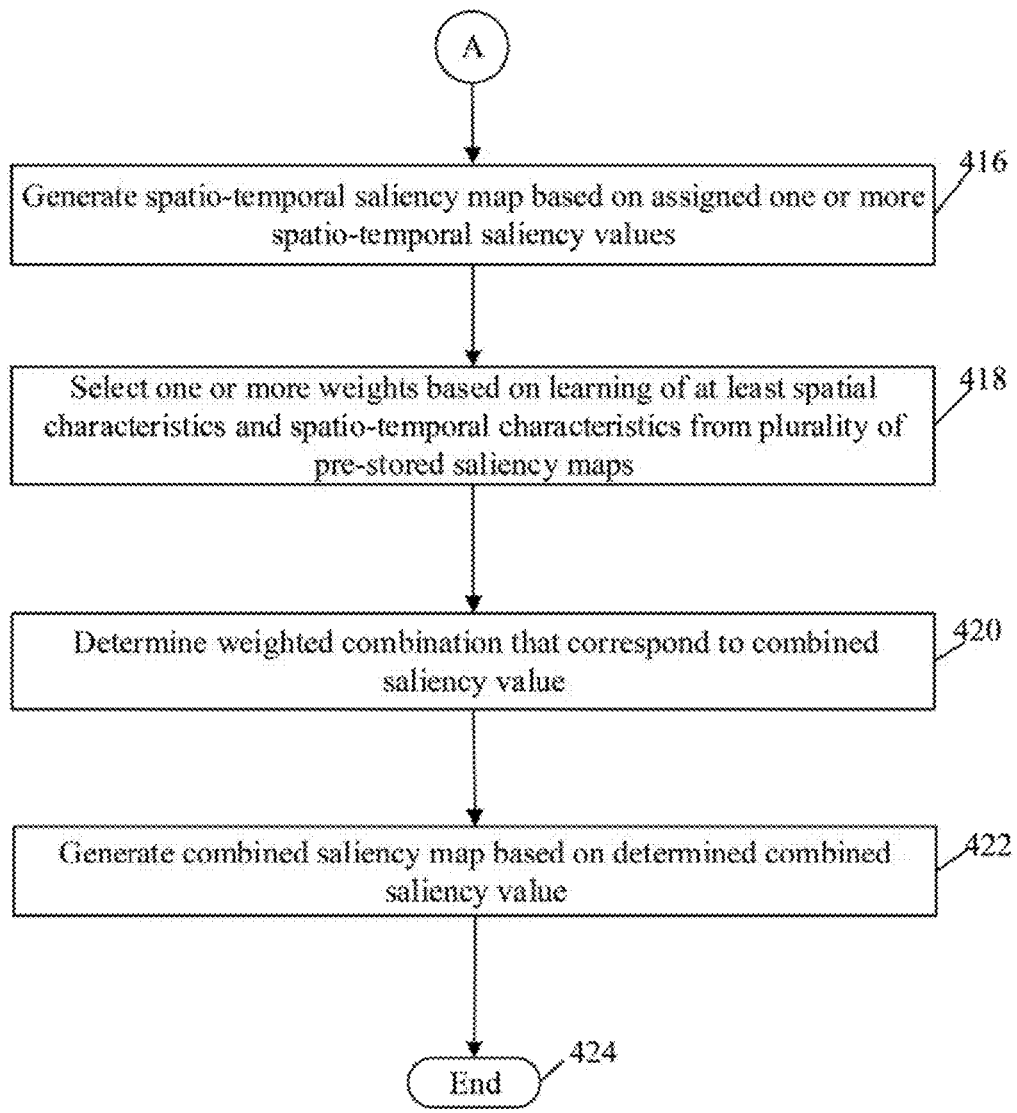

FIGS. 4A and 4B collectively depict a flowchart that illustrates a method to process video, in accordance with an embodiment of the disclosure. With reference to FIG. 4A and FIG. 4B, there is shown a flow chart 400a. The flow chart 400a is described in conjunction with FIGS. 1 and 2. The method starts at step 402 and proceeds to step 404.

At step 404, a video stream may be received by the video-processing device 102. The video stream may comprise a plurality of frames. At step 406, spatial saliency information of the one or more pixels in the current frame may be determined. The spatial saliency information may correspond to color, intensity, orientation, and texture information of the one or more pixels in the current frame. At step 408, one or more spatial saliency values may be assigned to the one or more pixels, based on the determined spatial saliency information. At step 410, a spatial saliency map may be generated based on the assigned one or more spatial saliency values of the one or more pixels.

At step 412, motion information and spatial distance information of the one or more pixels may be determined in the current frame with respect to the previous frame. The motion information may correspond to optical flow of the one or more pixels in the current frame with respect to the corresponding pixels in the previous frame. The spatial distance information may correspond to position of the one or more pixels in the current frame with respect to the corresponding pixels in the previous frame. At step 414, one or more spatio-temporal saliency values may be assigned to the one or more pixels, based on the determined motion information and spatial distance information. At step 416, a spatio-temporal saliency map may be generated based on the assigned one or more spatio-temporal saliency values of the one or more pixels.

At step 418, one or more weights may be selected based on learning of at least spatial characteristics and spatio-temporal characteristics from a plurality of pre-stored saliency maps. At step 420, a weighted combination that corresponds to a combined saliency value may be determined. The weighted combination may be computed based on one or more spatial saliency values of the one or more pixels in the current frame. Further, the weighted combination may be computed based on one or more spatio-temporal saliency values of the one or more pixels in the current frame with respect to the corresponding pixels in the previous frame, and the one or more weights of the one or more pixels. At step 422, a combined saliency map may be generated based on the determined weighted combination. Control passes to end step 424.

In accordance with an embodiment of the disclosure, a system to process a video stream is disclosed. The system may comprise a video-processing device 102 which may be configured to generate a spatial saliency map from spatial information associated with a current frame of the video stream. The video-processing device 102 may be configured to generate a spatio-temporal saliency map based on at least motion information associated with the current frame and the previous frame of the video stream. The video-processing device 102 may be configured to generate a combined saliency map based on a weighted combination of the generated spatial saliency map and the generated spatio-temporal saliency map.

Various embodiments of the disclosure may provide a non-transitory computer readable medium and/or storage medium, wherein there is stored thereon, a machine code and/or a computer program with at least one code section executable by a machine and/or a computer to process a video stream. The at least one code section in the video processor 202 may cause the machine and/or computer to perform the steps that comprise the generation of a spatial saliency map based on spatial information associated with a current frame of the video stream. Generation of a spatio-temporal saliency map may be based on at least motion information associated with the current frame and a previous frame of the video stream. Generation of a combined saliency map may be from a weighted combination of the generated spatial saliency map and the generated spatio-temporal saliency map.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A method for video processing, said method comprising:
   generating, by a video processing device, a spatial saliency map based on spatial information associated with a current frame of a video stream;
   generating, by said video processing device, a spatio-temporal saliency map based on at least motion information and spatial distance information associated with said current frame and a previous frame of said video stream;
   assigning at least one spatial saliency value to at least one pixel of a plurality of pixels in said current frame based on a difference between an average color value of said plurality of pixels and a color value of said at least one pixel that is more than a threshold value;
   computing at least one combined saliency value of said at least one pixel in said current frame at least based on said at least one spatial saliency value in said current frame; and
   generating, by said video processing device, a combined saliency map based on said at least one combined saliency value and a weighted combination of said generated spatial saliency map and said generated spatio-temporal saliency map.

2. The method according to claim 1, further comprising:
selecting, by said video processing device, at least one weight based on learning of at least spatial characteristics and spatio-temporal characteristics from a plurality of stored saliency maps; and
determining, by said video processing device, said weighted combination based on said selected at least one weight.

3. The method of claim 2, further comprising
computing said at least one combined saliency value of said at least one pixel in said current frame based on
at least one spatio-temporal saliency value of said at least one pixel of said plurality of pixels in said current frame with respect to said previous frame, and
said selected at least one weight.

4. The method of claim 3, further comprising:
computing said at least one combined saliency value of said at least one pixel of said plurality of pixels in said generated combined saliency map; and
minimizing, based on selection of said at least one weight, an average difference between said at least one combined saliency value of said at least one pixel of said plurality of pixels and saliency values of said at least one pixel of said plurality of pixels in said plurality of stored saliency maps.

5. The method according to claim 2, wherein said plurality of stored saliency maps are based on a first set of objects in at least one stored image, a second set of objects in at least one stored video stream, or a user's gaze detection with respect to at least one object at a time of capture of said video stream.

6. The method of claim 1, wherein said spatial information corresponds to at least one of color, intensity, orientation, or texture information of at least one pixel in said current frame.

7. The method of claim 1, wherein said motion information corresponds to an optical flow of at least one pixel in said current frame with respect to said previous frame.

8. The method of claim 1, wherein said generation of said spatial saliency map is based on said at least one spatial saliency value.

9. The method of claim 1, wherein said generation of said spatio-temporal saliency map is based on at least one spatio-temporal saliency value associated with said at least one pixel in said current frame with respect to said previous frame.

10. The method of claim 9, further comprising normalizing, by said video processing device, said at least one spatio-temporal saliency value to a range of values, wherein said at least one spatio-temporal saliency value corresponds to an optical flow of at least one pixel in said current frame with respect to said previous frame.

11. The method of claim 1, further comprising determining, by said video processing device, at least one salient object based on said combined saliency map.

12. The method according to claim 1, wherein said spatial distance information corresponds to a shift in spatial position of said at least one pixel in said current frame with respect to position of said at least one pixel in said previous frame,
wherein said at least one pixel is associated with a first object in said current frame, and
wherein said at least one pixel is associated with a second object that is similar to said first object in said previous frame.

13. A system for video processing, said system comprising:
a video processing device that comprises circuitry configured to:
generate a spatial saliency map based on spatial information associated with a current frame of a video stream;
generate a spatio-temporal saliency map based on at least motion information and spatial distance information associated with said current frame and a previous frame of said video stream;
assign at least one spatial saliency value to at least one pixel of a plurality of pixels in said current frame based on a difference between an average color value of said plurality of pixels and a color value of said at least one pixel that is more than a threshold value;
compute at least one combined saliency value of said at least one pixel in said current frame at least based on said at least one spatial saliency value in said current frame; and
generate a combined saliency map based on said at least one combined saliency value and a weighted combination of said generated spatial saliency map and said generated spatio-temporal saliency map.

14. The system according to claim 13, wherein said circuitry is further configured to:
select at least one weight based on analysis of at least spatial characteristics and spatio-temporal characteristics from a plurality of stored saliency maps; and
determine said weighted combination based on said selected at least one weight.

15. The system of claim 14, wherein said circuitry is further configured to
compute said at least one combined saliency value of said at least one pixel in said current frame based on
at least one spatio-temporal saliency value of said at least one pixel of said plurality of pixels in said current frame with respect to said previous frame, and
said selected at least one weight.

16. The system of claim 15, wherein said circuitry is further configured to:
compute said at least one combined saliency value of said at least one pixel of said plurality of pixels in said generated combined saliency map; and
minimize, based on selection of said at least one weight, an average difference between said at least one combined saliency value of said at least one pixel of said plurality of pixels and saliency values of said at least one pixel of said plurality of pixels in said plurality of stored saliency maps.

17. The system according to claim 14, wherein said plurality of stored saliency maps are based on
a first set of objects in at least one stored image,
a second set of objects in at least one stored video stream, or
a user's gaze detection with respect to at least one object at a time of capture of said video stream.

18. The system of claim 13, wherein said spatial information corresponds to at least one of color, intensity, orientation, or texture information of at least one pixel in said current frame.

19. The system of claim 13, wherein said motion information corresponds to an optical flow of at least one pixel in said current frame with respect to said previous frame.

20. The system of claim 13, wherein said generation of said spatial saliency map is based on said at least one spatial saliency value.

21. The system of claim 13, wherein said generation of said spatio-temporal saliency map is based on at least one spatio-temporal saliency value associated with said at least one pixel in said current frame with respect to said previous frame.

22. The system of claim 21, wherein said circuitry is configured to normalize said at least one spatio-temporal saliency value to a range of values, and wherein said at least one spatio-temporal saliency value corresponds to an optical flow of said at least one pixel in said current frame with respect to said previous frame.

23. The system of claim 13, wherein said circuitry is further configured to determine at least one salient object based on said generated combined saliency map,
wherein said weighted combination of said generated spatial saliency map and said generated spatio-temporal saliency map is determined based on at least a summation of a first value, a second value, and a third value,
wherein said first value is a product of a first constant weight and said at least one spatial saliency value,
wherein said second value is a product of a second constant weight and at least one spatio-temporal saliency value of said at least one pixel, and
wherein said third value is a product of a third constant weight, said at least one spatial saliency value, and said at least one spatio-temporal saliency value.

24. A non-transitory computer-readable storage medium having stored thereon, computer-executable instructions for causing a computer comprising one or more processors to execute operations, the operations comprising:
generating, by a video processing device, a spatial saliency map based on spatial information associated with a current frame of a video stream;
generating, by said video processing device, a spatio-temporal saliency map based on at least motion information and spatial distance information associated with said current frame and a previous frame of said video stream;
assigning at least one spatial saliency value to at least one pixel of a plurality of pixels in said current frame based on a difference between an average color value of said plurality of pixels and a color value of said at least one pixel that is more than a threshold value;
computing at least one combined saliency value of said at least one pixel in said current frame at least based on said at least one spatial saliency value in said current frame; and
generating, by said video processing device, a combined saliency map based on said at least one combined saliency value and a weighted combination of said generated spatial saliency map and said generated spatio-temporal saliency map.

25. A system for video processing, said system comprising:
a video processing device that comprises circuitry configured to:
generate a spatial saliency map based on spatial information associated with a current frame of a video stream;
generate a spatio-temporal saliency map based on at least motion information associated with said current frame and a previous frame of said video stream;
generate a combined saliency map based on a weighted combination of said generated spatial saliency map and said generated spatio-temporal saliency map; and
determine at least one salient object based on said generated combined saliency map,
wherein said weighted combination of said generated spatial saliency map and said generated spatio-temporal saliency map is determined based on at least a summation of a first value, a second value, and a third value,
wherein said first value is a product of a first constant weight and a spatial saliency value of a pixel of said current frame,
wherein said second value is a product of a second constant weight and a spatio-temporal saliency value of said pixel, and
wherein said third value is a product of a third constant weight, said spatial saliency value, and said spatio-temporal saliency value.

* * * * *